US012774028B2

(12) United States Patent
Do et al.

(10) Patent No.: US 12,774,028 B2
(45) Date of Patent: Oct. 27, 2026

(54) APPARATUS AND METHOD FOR ESTIMATING RACK FORCE OF STEER BY WIRE SYSTEM

(71) Applicant: HYUNDAI MOBIS CO., LTD., Seoul (KR)

(72) Inventors: Young Hwan Do, Yongin-si (KR); Hyung Ju Kwon, Yongin-si (KR); Jeong Min Lee, Yongin-si (KR); Hee Kyu Lim, Yongin-si (KR); Hyun Su Kim, Yongin-si (KR); Eui Nam Jeong, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 19/055,713

(22) Filed: Feb. 18, 2025

(65) Prior Publication Data

US 2026/0241982 A1 Aug. 20, 2026

(51) Int. Cl.
*B62D 5/04* (2006.01)

(52) U.S. Cl.
CPC .................................. *B62D 5/0463* (2013.01)

(58) Field of Classification Search
CPC .................................................... B62D 5/0463
See application file for complete search history.

(56) References Cited

U.S. PATENT DOCUMENTS

2012/0296525 A1* 11/2012 Endo .................... B62D 5/0466 701/42
2019/0092377 A1* 3/2019 Shin ..................... B62D 5/0481
2020/0391789 A1* 12/2020 Kim ...................... B62D 5/0421
2021/0354750 A1* 11/2021 Kim ........................ B62D 5/006
2022/0081024 A1* 3/2022 Roeckner ............. B62D 5/0403
2022/0169306 A1* 6/2022 Ramanujam ......... B62D 5/0463
2022/0371658 A1* 11/2022 Hambloch ........... B62D 5/0481
2023/0063764 A1* 3/2023 Do ....................... B62D 5/0481
2023/0109469 A1* 4/2023 Hambloch ............. B62D 6/008 701/42

FOREIGN PATENT DOCUMENTS

KR 10-2018-0007393 A 7/2022

* cited by examiner

*Primary Examiner* — Long T Tran
(74) *Attorney, Agent, or Firm* — NovoTechIP International PLLC

(57) ABSTRACT

An apparatus for estimating a rack force of a steer-by-wire (SBW) system includes a memory configured to store an instruction for estimating a rack force of the SBW system, and a processor configured to execute the instruction stored in the memory, in which the processor creates an instruction motor torque value for controlling a motor of a road wheel actuator (RWA) system by using state information of a vehicle and estimates a rack force of the SBW system by applying the instruction motor torque value to a rack force estimation model.

13 Claims, 6 Drawing Sheets

APPARATUS AND METHOD FOR ESTIMATING RACK FORCE OF STEER BY WIRE SYSTEM

TECHNICAL FIELD

Exemplary embodiments of the present disclosure relate to an apparatus and method for estimating a rack force of a steer-by-wire (SBW) system.

BACKGROUND

A steer-by-wire (SBW) system refers to a steering system in which a steering wheel and a driving wheels of a vehicle are mechanically disconnected. The SBW system may receive a rotation signal from the steering wheel through an electronic control unit and steer the vehicle by operating a steering motor connected to the driving wheel in response to the inputted rotation signal.

A rack force is very important in implementing steering operability as well as controlling the vehicle in terms of performing transverse control and steering operability control on the vehicle.

Because a driver is not physically connected to a rack bar of the SBW system, it is necessary to measure or estimate a rack force and notify the driver of information on a road surface. Therefore, the SBW system estimates a lateral force by using a vehicle dynamics model and estimate a rack force by using a steering system model.

In this case, the SBW system estimates the rack force by using an actual Q-axis current and a primary low-pass filter (LPF). Because the SBW system uses the actual Q-axis current, there may occur a problem in that the rack force decreases as a Q-axis current decreases when a D-axis current is generated during high-speed steering. In addition, because only the primary low-pass filer (LPF) is used to filter the estimated value, which makes it difficult to select a filtering coefficient at an appropriate level and obtain a clean rack force with fast responsiveness.

The background technology of the present disclosure is disclosed in Korean Patent Application Laid-Open No. 10-2018-0007393 (published on Jan. 23, 2018 and entitled 'Apparatus and Method for Controlling Steering of SBW System').

SUMMARY

Various embodiments are directed to an apparatus and method for estimating a rack force of an SBW system, the apparatus and method being capable of improving steering operability for a driver by accurately estimating a rack force on the basis of an instruction motor torque value.

In an embodiment, an apparatus for estimating a rack force of a steer-by-wire (SBW) system includes: a memory configured to store an instruction for estimating a rack force of the SBW system; and a processor configured to execute the instruction stored in the memory, in which the processor creates an instruction motor torque value for controlling a motor of a road wheel actuator (RWA) system by using state information of a vehicle and estimates a rack force of the SBW system by applying the instruction motor torque value to a rack force estimation model.

In the present disclosure, the processor may create the instruction motor torque value by filtering a target position instruction, which is created on the basis of the state information of the vehicle, and an RWA position, which is fed back from the RWA system, by a low-pass filter with different frequencies, differentiating the target position instruction and the RWA position, tuning the target position instruction and the RWA position with a designated gain, and then adding up the target position instruction and the RWA position.

In the present disclosure, the processor may adjust a cut-off frequency of the low-pass filter on the basis of information of a steering wheel.

In the present disclosure, the information of the steering wheel may be an angular velocity or an angular acceleration of the steering wheel.

In the present disclosure, the processor may increase the cut-off frequency of the low-pass filter when the angular velocity or the angular acceleration of the steering wheel increases.

In another embodiment, a method of estimating a rack force of a steer-by-wire (SBW) system includes: creating, by a processor, an instruction motor torque value for controlling a motor of a road wheel actuator (RWA) system by using state information of a vehicle; and estimating, by the processor, a rack force of the SBW system by applying the instruction motor torque value to a rack force estimation model.

In the present disclosure, the creating of the instruction motor torque value may include creating the instruction motor torque value by filtering a target position instruction, which is created on the basis of the state information of the vehicle, and an RWA position, which is fed back from the RWA system, by a low-pass filter with different frequencies, differentiating the target position instruction and the RWA position, tuning the target position instruction and the RWA position with a designated gain, and then adding up the target position instruction and the RWA position.

In the present disclosure, the creating of the instruction motor torque value may include adjusting a cut-off frequency of the low-pass filter on the basis of information of a steering wheel.

In the present disclosure, the information of the steering wheel may be an angular velocity or an angular acceleration of the steering wheel.

In the present disclosure, the creating of the instruction motor torque value may include increasing the cut-off frequency of the low-pass filter when the angular velocity or the angular acceleration of the steering wheel increases.

The apparatus and method for estimating a rack force of an SBW system according to one aspect of the present disclosure accurately estimate the rack force by applying the instruction motor torque value to the rack force estimation model and improve the steering operability for the driver on the basis of the rack force.

DETAILED DESCRIPTION

Figure 1:
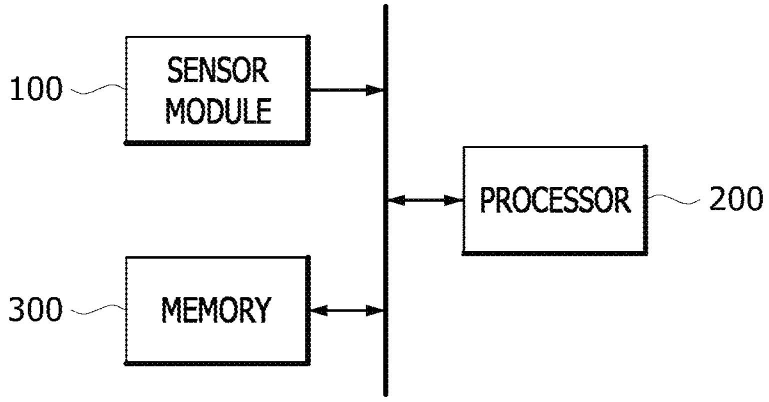
FIG. 1 is a block configuration view of an apparatus for estimating a rack force of an SBW system according to an embodiment of the present disclosure.

Hereinafter, an apparatus and method for estimating a rack force of an SBW system will be described below with reference to the accompanying drawings through various exemplary embodiments. Here, thicknesses of lines illustrated in the drawings, sizes of constituent elements, or the like may be exaggerated for clarity and convenience of description. In addition, the terms used below are defined in consideration of the functions thereof in the present disclosure and may vary depending on the intention of a user or an operator or a usual practice. Therefore, such terms should be defined based on the entire contents of the present specification.

FIG. 1 is a block configuration view of an apparatus for estimating a rack force of an SBW system according to an embodiment of the present disclosure.

With reference to FIG. 1, an apparatus for estimating a rack force of an SBM system according to an embodiment of the present disclosure includes a sensor module 100, a processor 200, and a memory 300.

The SBW system steers a vehicle by using an electric motor such as a motor instead of a mechanical connection device such as a steering column, a universal joint, or a pinion shaft between a steering wheel and a vehicle wheel.

The SBW system includes a steering feedback actuator (SFA) system and a road wheel actuator (RWA) system.

The SFA system is connected to the steering wheel and detects torque applied to the steering wheel. The SFA system provides reaction force torque to the steering wheel in accordance with steering through a rack bar at a lower side. The RWA system operates the vehicle wheel on the basis of steering control information. The SFA system and the RWA system are connected by a wire.

The sensor module 100 detects state information related to the vehicle steering.

The sensor module 100 includes a steering angle sensor, a steering torque sensor, a reaction force torque sensor, a motor encoder sensor, a rack position sensor, and a motor torque sensor.

The steering angle sensor detects a steering angle of the steering column that varies depending on a manipulation of a driver on the steering wheel.

The steering torque sensor is installed on the steering column and detects steering torque applied to the steering column.

The reaction force torque sensor detects reaction force torque outputted from a reaction force motor.

The motor encoder sensor detects an angular velocity of the steering wheel.

The rack position sensor is installed on the rack bar and detects information on a position of a rack.

The motor torque sensor detects torque of a drive motor.

In the present embodiment, the example has been described in which the steering angle, the steering torque, the reaction force torque, the angular velocity of the steering wheel, information on the position of the rack, and the torque of the drive motor are detected by the sensor module 100. However, state information detected by the sensor module 100 is not specially limited thereto.

The memory 300 stores information, logics, or instructions for estimating the rack force of the SBW system.

The memory 300 may include at least one storage medium among a flash memory type storage medium, a hard disc type storage medium, a multimedia card micro-type storage medium, a card type memory, a random access memory (RAM), a static random access memory (SRAM), a read-only memory (ROM), a programmable read-only memory (PROM), an erasable programmable read-only memory (EPROM), and an electrically erasable programmable read-only memory (EEPROM).

The processor 200 estimates the rack force by using state information and an instruction motor torque value detected by the sensor module 100.

Figure 2:
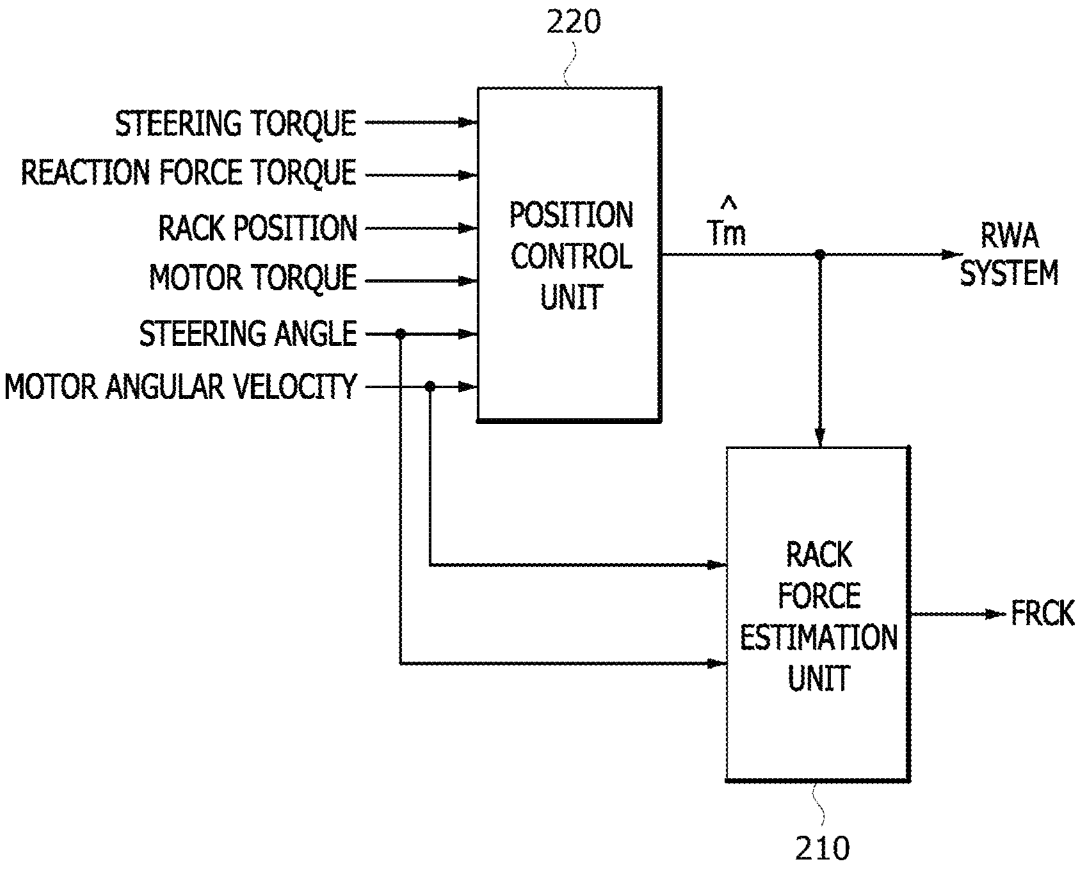
FIG. 2 is a block configuration view of a processor according to the embodiment of the present disclosure.

FIG. 2 is a block configuration view of the processor according to the embodiment of the present disclosure.

With reference to FIG. 2, the processor 200 estimates the rack force of the SBW system by executing the instruction stored in the memory 300.

The processor 200 includes a rack force estimation unit 210 and a position control unit 220.

The rack force estimation unit 210 estimates the rack force by applying the state information and the instruction motor torque value, which are detected by the sensor module 100, to the rack force estimation model. The instruction motor torque value is an output value from the position control unit 220 for controlling a motor of the RWA system. This configuration will be described below.

The rack force estimation model may be a model with one degree of freedom.

Figure 3:
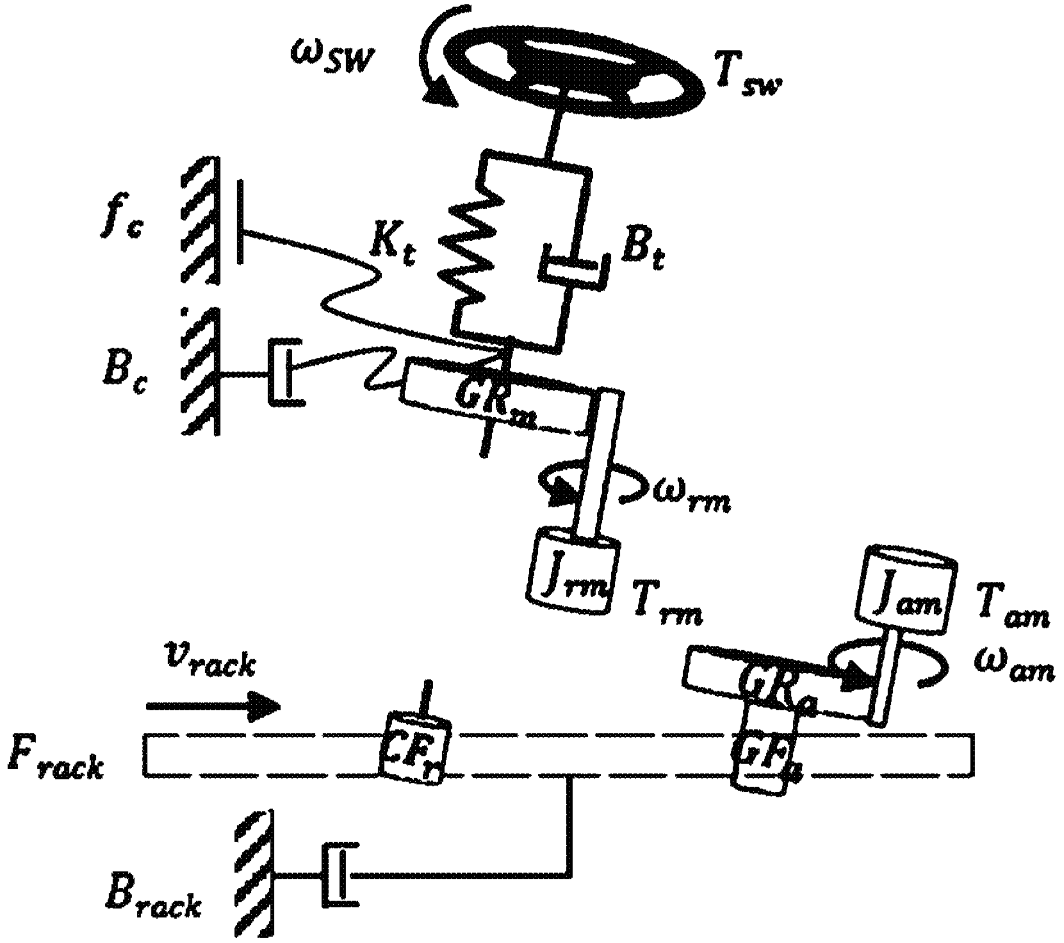
FIG. 3 is a conceptual view of a rack force estimation method using a rack force estimation model according to the embodiment of the present disclosure.

FIG. 3 is a conceptual view of a rack force estimation method using the rack force estimation model according to the embodiment of the present disclosure.

The rack force estimation model is shown in Equation 1 below.

[Equation 1]

$$F_{rck} = \frac{w_c}{s+w_c}\cdot\frac{1}{CF_a\cdot GR_a}\cdot(\hat{T}_m - J_m\cdot s\cdot w_m - B_{rck}\cdot(CF_a\cdot GR_a)^2\cdot w_m$$

FIG. 3 is a conceptual view of the rack force estimation method using the rack force estimation model according to the embodiment of the present disclosure.

Here, $F_{rck}$ represents a rack force, s represents a differential, $w_c$ represents a cut-off frequency of a low-pass filter, $CF_a$ represents a gear ratio of a gear configured to convert a rotational motion of a motor into a rectilinear motion, $GR_a$ represents a gear ratio of a speed reducer used for the speed reducer, $\hat{T}_m$ represents an instruction motor torque value, $J_m$ represents a motor inertia, $w_m$ represents an angular velocity of the motor, and $B_{rck}$ represents a damping coefficient of the rack bar.

With reference to Equation 1, the rack force may be estimated in various ways on the basis of the instruction motor torque value.

In general, a Q-axis current of the motor may decrease as a D-axis current is generated during high-speed steering. The decrease in Q-axis current of the motor may cause a decrease in rack force.

Therefore, in the present embodiment, the instruction motor torque value is used instead of the Q-axis current in order to prevent the rack force from being decreased by the occurrence of the D-axis current during the high-speed steering.

The instruction motor torque value is an output value from the position control unit 220.

In case that an angle error increases as the Q-axis current is decreased by the occurrence of the D-axis current during the high-speed steering, the instruction motor torque value also increases, such that a rack force estimation value also increases. Therefore, the instruction motor torque value may prevent a situation in which the rack force is decreased by the occurrence of the D-axis current.

The position control unit 220 creates a target position instruction on the basis of the state information of the vehicle and generates the instruction motor torque value on the basis of the target position instruction and an RWA position fed back from an RWA system 400. Because the configuration in which the position control unit 220 creates the target position instruction on the basis of the state information of the vehicle is apparent to those skilled in the art, a detailed description thereof will be omitted.

The instruction motor torque value is inputted to the RWA system 400. The RWA system 400 controls an RWA position, i.e., a feedback angle on the basis of the instruction motor torque value.

The position control unit 220 may include a D gain ($D_{cmd}$) related to the target position instruction and a D gain ($D_{fed}$) related to the RWA position information fed back from the RWA system 400.

Because the differential value of the target position instruction (i.e., an instruction angle) is very helpful in improving response performance, a PID formula such as Equation 2 below may be used. That is, the target position instruction (i.e., the instruction angle) and the RWA position (i.e., the feedback angle) fed back from the RWA system 400 are filtered by the low-pass filter with different frequencies (Hz), differentiated, tuned by applying designated gains $D_{cmd}$ and $D_{fed}$, and then summed.

Figure 4:
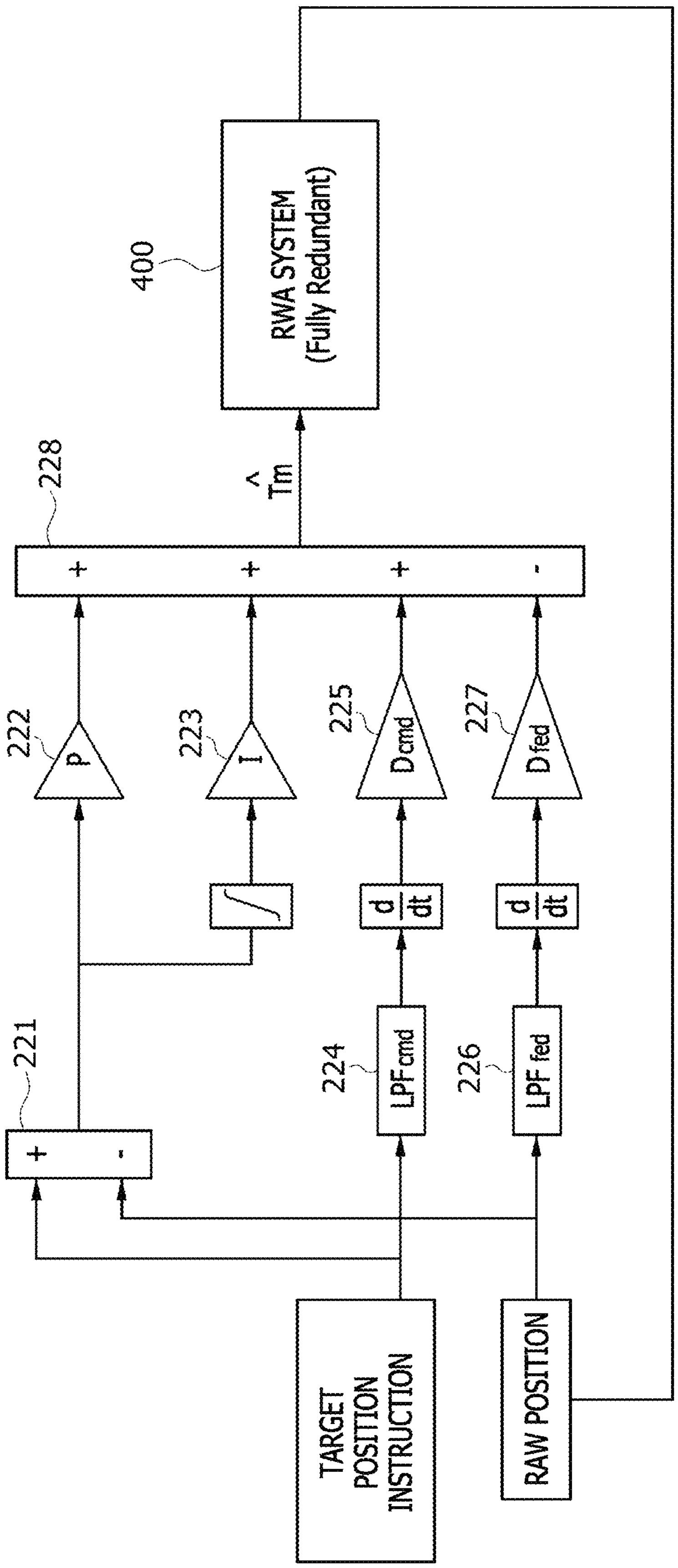
FIG. 4 is a block configuration view of a position control unit of the processor according to the embodiment of the present disclosure.

FIG. 4 is a block configuration view of the position control unit of the processor according to the embodiment of the present disclosure.

With reference to FIG. 4, the position control unit 220 includes a first adder 221, a P (proportional) controller 222, an I (integral) controller 223, a first low-pass filter 224, a first D (differential) controller 225, a second low-pass filter 226, a second D (differential) controller 227, and a second adder 228.

The first adder 221 calculates an error value corresponding to a difference by adding up the target position instruction from the steering wheel (not illustrated) and the RWA position information fed back from the RWA system 400.

The P controller 222 multiples the error value, which is calculated by the first adder 221, by a designated P gain.

The I controller 223 integrates the error value, which is calculated by the first adder 221, and multiples the error value by a designated I gain.

The first low-pass filter 224 filters the target position instruction (i.e., the instruction angle) with a designated cut-off frequency (Hz).

The first D controller 225 differentiates the value filtered by the first low-pass filter 224 and multiplies the value by the designated D gain $D_{cmd}$.

In this case, because the D gain $D_{cmd}$ is related to the responsiveness of the RWA system 400, the responsiveness of the rack force may deteriorate in case that excessive filtering is applied to a D term.

Therefore, the first low-pass filter 224 may improve the responsiveness by adjusting the cut-off frequency on the basis of the information of the steering wheel. The information on the steering wheel may be an angular velocity of the steering wheel or an angular acceleration of the steering wheel.

That is, the first low-pass filter 224 increases the cut-off frequency on the basis of the angular velocity of the steering wheel when the angular velocity of the steering wheel increases. The first low-pass filter 224 increases the cut-off frequency on the basis of the angular acceleration of the steering wheel when the angular acceleration of the steering wheel increases. Therefore, the responsiveness may be improved even in a case in which the driver quickly steers the steering wheel.

The second low-pass filter 226 filters the RWA position (i.e., the feedback angle), which is fed back from the RWA system 400, with the designated cut-off frequency (Hz).

The second D controller 227 differentiates the value, which is filtered by the second low-pass filter 226, and multiplies the value by the designated D gain $D_{fed}$.

The second adder creates the instruction motor torque value by adding up the values outputted from the P controller 222, the I controller 223, the first D controller 225, and the second D controller 227 and inputs the created instruction motor torque value into the RWA system 400 and the rack force estimation unit 210.

Therefore, the RWA system 400 controls the position of the motor on the basis of the instruction motor torque value. In addition, as described above, the rack force estimation unit 210 estimates the rack force by applying the instruction motor estimation value and the state information of the vehicle to the rack force estimation model.

In order to improve the system responsiveness, the present embodiment may include the first D controller 225 and the second D controller 227 respectively including the D gain $D_{cmd}$ related to the target position instruction and the D gain $D_{fed}$ related to the RWA position information fed back from the RWA system 400.

The processor 200 may be connected to the memory 300, and the memory 300 may store instructions for performing the operations, the steps, and the like according to the embodiment of the present disclosure. In this case, the memory 300 may include magnetic storage media or flash storage media in addition to the volatile storage device configured to require electric power to maintain the stored information. However, the scope of the present disclosure is not limited thereto.

In addition, the processor 200 may be configured to perform the functions separately at a hardware, software, or logic level. In this case, dedicated hardware may be used to perform each of the functions. To this end, the processor 200 may be implemented by or include at least one of an application specific integrated circuit (ASIC), a digital signal processor (DSP), a programmable logic device (PLD), field programmable gate arrays (FPGAs), a central processing unit (CPU), microcontrollers, and/or microprocessors.

In the present embodiment, in order to assist in understanding the embodiment, the configuration has been described in which the position control unit 220 and the rack force estimation unit 210 are separately configured in the processor 200. However, according to the embodiment, the processor 200 may be configured to perform the low-level configurations in an integrated manner.

Figure 5:
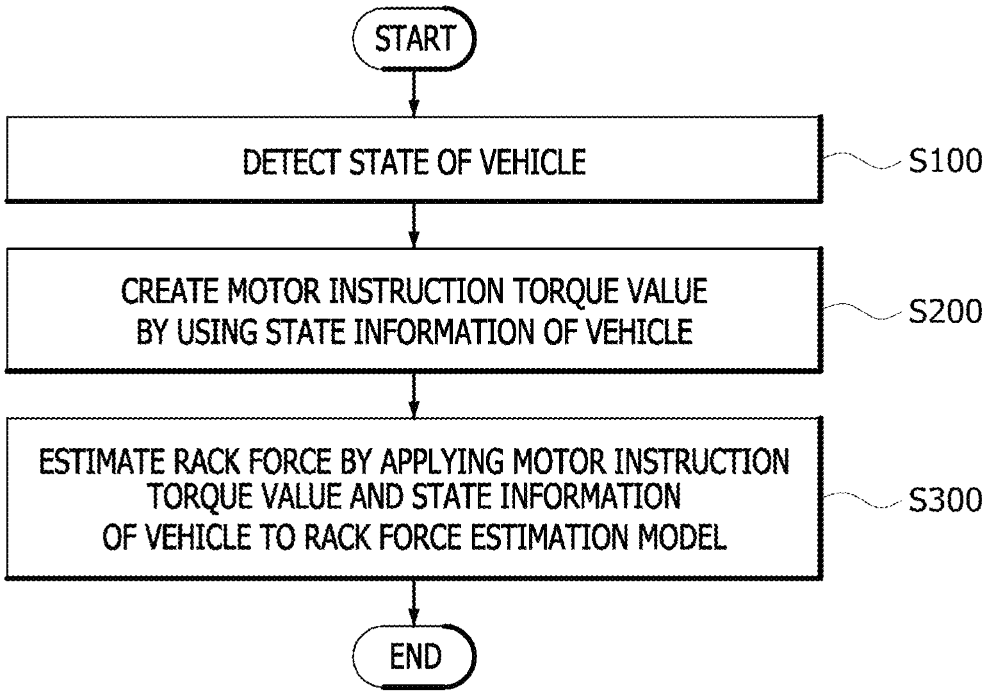
FIG. 5 is a flowchart of a method of estimating a rack force of an SBW system according to the embodiment of the present disclosure.

FIG. 5 is a flowchart of a method of estimating a rack force of an SBW system according to the embodiment of the present disclosure.

With reference to FIG. 5, first, the sensor module 100 detects the state information of the vehicle (S100).

The state information of the vehicle may include the steering angle, the steering torque, the reaction force torque, the angular velocity of the steering wheel, the position information of the rack, and the torque of the drive motor.

The position control unit 220 generates the instruction motor torque value on the basis of the target position instruction and the RWA position fed back from the RWA system 400 (S200).

In this case, the position control unit 220 differentiates the value, which is filtered by the low-pass filter with different frequencies (Hz), on the basis of the target position instruction and the RWA position (i.e., the feedback angle) fed back from the RWA system 400 and the value is tuned by using the designated gains $D_{cmd}$ and $D_{fed}$, thereby creating the instruction motor torque value.

In this case, the position control unit 220 increases the cut-off frequency on the basis of the angular velocity of the steering wheel when the angular velocity of the steering wheel increases, or the position control unit 220 increases the cut-off frequency on the basis of the angular acceleration of the steering wheel when the angular acceleration of the steering wheel increases. Therefore, it is possible to improving the responsiveness even in case that the driver quickly steers the steering wheel.

The position control unit 220 inputs the created instruction motor torque value into the RWA system 400 and the rack force estimation unit 210.

The rack force estimation unit 210 estimates the rack force by applying the state information and the instruction motor torque value, which are detected by the sensor module 100, to the rack force estimation model (S300).

In this case, the rack force estimation unit 210 uses the instruction motor torque value without using the Q-axis current for the rack force estimation model, thereby preventing the situation in which the rack force is decreased by the occurrence of the D-axis current during high-speed steering.

Figure 6:
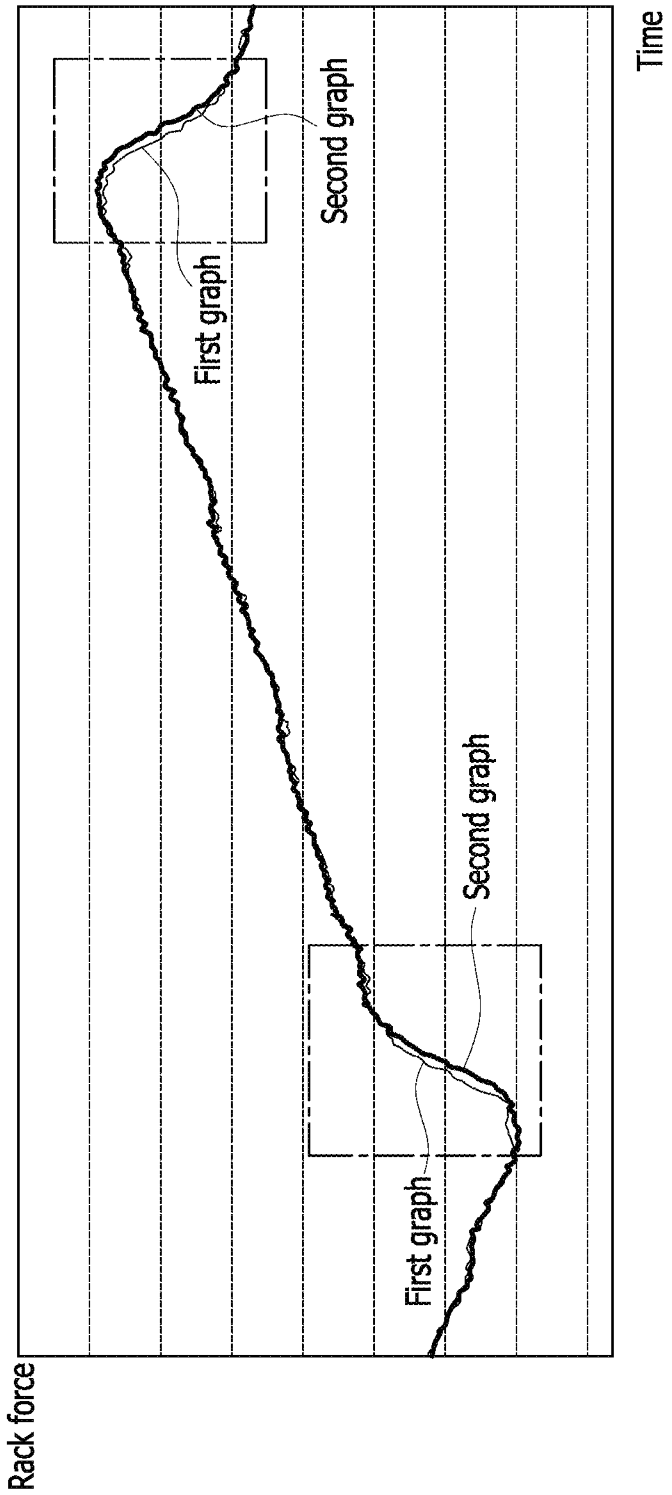
FIG. 6 is a view illustrating a result of an actual driving evaluation of the apparatus for estimating a rack force of an SBW system according to the embodiment of the present disclosure.

FIG. 6 is a view illustrating a result of an actual driving evaluation of the apparatus for estimating a rack force of an SBW system according to the embodiment of the present disclosure.

FIG. 6 illustrates a result of estimating the rack force during the actual driving evaluation of the apparatus for estimating a rack force of an SBW system.

The first graph indicates the modified rack force filtered by the D term, and the second graph indicates the rack force in the related art filtered by the LPF.

With reference to the red box in FIG. 6, it can be seen that the modified rack force is equivalent to the rack force in the related art, and the delay of the modified rack force is improved in comparison with the rack force in the related art.

As described above, the apparatus and method for estimating a rack force of an SBW system according to the embodiment of the present disclosure accurately estimate the rack force by applying the instruction motor torque value to the rack force estimation model and improve the steering operability for the driver on the basis of the rack force.

For example, the configurations described in the present specification may be implemented as methods or processes, devices, software programs, data stream, or signals. Even though the implementation of the single form is described (e.g., only the method is described), the described features may also be implemented in other forms (e.g., devices or programs). The device may be implemented as appropriate hardware, software, firmware, and the like. For example, the method may be implemented by devices such as processors generally referring to processing devices including computers, microprocessors, integrated circuits, programmable logic devices, or the like. The processors also include communication devices such as computers, cellular phones, portable/personal information terminals (personal digital assistants (PDA)), and other devices that facilitates information communication with final users.

While the present disclosure has been described with reference to the embodiment illustrated in the drawings, the embodiment is only for illustrative purpose, and those skilled in the art to which the present technology pertains will understand that various modifications of the embodiment and any other embodiment equivalent thereto are available. Accordingly, the true technical protection scope of the present disclosure should be defined by the appended claims. Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for estimating a rack force of a steer-by-wire (SBW) system of a vehicle, the apparatus comprising:

a memory configured to store an instruction for estimating the rack force of the SBW system; and a processor configured to execute the instruction stored in the memory, wherein the processor calculates an instruction motor torque value for controlling a motor of a road wheel actuator (RWA) system of the vehicle using state information of the vehicle and estimates the rack force of the SBW system by applying the instruction motor torque value to a rack force estimation model that uses the instruction motor torque value instead of a measured Q-axis current of the motor such that the estimated rack force is prevented from decreasing when a D-axis current component is generated during high-speed steering; and wherein the processor further applies the estimated rack force to the SBW system to increase steering operability for a driver of the vehicle.

2. The apparatus of claim 1, wherein the processor calculates the instruction motor torque value by filtering a target position instruction which is generated based on the state information of the vehicle, and an RWA position which is output by the RWA system, through a low-pass filter with different frequencies, differentiating the target position instruction and the RWA position, tuning the target position instruction and the RWA position with a designated gain, and then adding together the target position instruction and the RWA position.

3. The apparatus of claim 2, wherein the processor adjusts a cut-off frequency of the low-pass filter based on a measurement of movement of a steering wheel of the vehicle.

4. The apparatus of claim 3, wherein the measurement of movement of the steering wheel is measurement of an angular velocity or an angular acceleration of the steering wheel.

5. The apparatus of claim 4, wherein the processor increases the cut-off frequency of the low-pass filter when the angular velocity or the angular acceleration of the steering wheel increases.

6. The apparatus of claim 1, wherein the rack force estimation model comprises a one-degree-of-freedom model including a motor inertia term, a damping term, and gear-ratio parameters.

7. The apparatus of claim 1, wherein the processor estimating the rack force comprises using at least a motor angular velocity, a motor inertia value, and a rack-bar damping coefficient.

8. The apparatus of claim 1, wherein the processor increases a cut-off frequency of a low-pass filter when an angular velocity or angular acceleration of a steering wheel increases.

9. A method of estimating a rack force of a steer-by-wire (SBW) system of a vehicle, the method comprising:

calculating, by a processor, an instruction motor torque value for controlling a motor of a road wheel actuator (RWA) system of the vehicle by using state information of the vehicle;

estimating, by the processor, the rack force of the SBW system by applying the instruction motor torque value to a rack force estimation model that uses the instruction motor torque value instead of a measured Q-axis current of the motor such that the estimated rack force is prevented from decreasing when a D-axis current component is generated during high-speed steering; and applying the estimated rack force to the SBW system to increase steering operability for a driver of the vehicle.

10. The method of claim 9, wherein calculating the instruction motor torque value comprises generating the instruction motor torque value by filtering a target position instruction which is generated based on the state information of the vehicle, and an RWA position which is output by the RWA system through a low-pass filter with different frequencies, differentiating the target position instruction and the RWA position, tuning the target position instruction and the RWA position with a designated gain, and then adding the target position instruction and the RWA position.

11. The method of claim 10, wherein calculating the instruction motor torque value comprises adjusting a cut-off frequency of the low-pass filter based on a measurement of movement of a steering wheel of the vehicle.

12. The method of claim 11, wherein the measurement of movement of the steering wheel is measurement of an angular velocity or an angular acceleration of the steering wheel.

13. The method of claim 12, wherein calculating the instruction motor torque value comprises increasing the cut-off frequency of the low-pass filter when the angular velocity or the angular acceleration of the steering wheel increases.

* * * * *